United States Patent [19]

Asahara et al.

[11] Patent Number: 5,295,179
[45] Date of Patent: Mar. 15, 1994

[54] PORTABLE TELEPHONE SYSTEM HAVING SELECTABLE BYPASS LINE

[75] Inventors: Masaru Asahara; Shunroku Sasaki; Takuro Oguchi, all of Kawasaki, Japan

[73] Assignee: Fujitsu Limited, Kawasaki, Japan

[21] Appl. No.: 871,055

[22] Filed: Apr. 20, 1992

[30] Foreign Application Priority Data

Apr. 18, 1991 [JP] Japan .................... 3-086433

[51] Int. Cl.$^5$ ........................................... H04M 11/00
[52] U.S. Cl. ........................................... 379/58
[58] Field of Search ................... 379/56, 58, 59, 61, 379/62, 63, 159; 455/33.1, 33.2, 33.3, 33.4

[56] References Cited

U.S. PATENT DOCUMENTS

| | | | |
|---|---|---|---|
| 4,640,987 | 2/1987 | Tsukada et al. | 379/62 |
| 5,127,042 | 6/1992 | Gillig et al. | 379/59 |
| 5,159,625 | 10/1992 | Zicker | 379/59 |

FOREIGN PATENT DOCUMENTS

| | | | |
|---|---|---|---|
| 0317034 | 12/1989 | Japan | 379/62 |
| 2234649 | 2/1991 | Great Britain . | |

*Primary Examiner*—Jin F. Ng
*Assistant Examiner*—William D. Cumming
*Attorney, Agent, or Firm*—Staas & Halsey

[57] ABSTRACT

A portable telephone system includes a first telephone network including a terminal station, a first telephone set connected to the first telephone network via the terminal station, a second telephone network including a communication center which is connected to the first telephone network at a connection point, and at least one second telephone set registered in the communication center and connected to the first telephone network via the terminal station. The second telephone set is a portable telephone set having a base station part and a portable station. The communication center includes a first part for sending a line hold signal to the first telephone set via the first telephone network when a call to the portable station of the second telephone set is received via the first telephone network, and a second part for sending control information to the base station part of the second telephone set, where the control information includes a notification that a call is made to the portable station of the second telephone set from the first telephone set and a telephone number of the first telephone set. The base station part of the second telephone set includes a third part for dialing the telephone number of the first telephone set in response to the control information received from the communication center, so that a service connection is made, after the third means dials the telephone number of the first telephone set, between the first and second telephone sets via the terminal station of the first telephone network.

10 Claims, 11 Drawing Sheets

FIG.11
TELEPHONE SET B

PORTABLE TELEPHONE SYSTEM HAVING SELECTABLE BYPASS LINE

BACKGROUND OF THE INVENTION

The present invention generally relates to portable telephone systems, and more particularly to a portable telephone system having a selectable bypass line.

Figure 1:
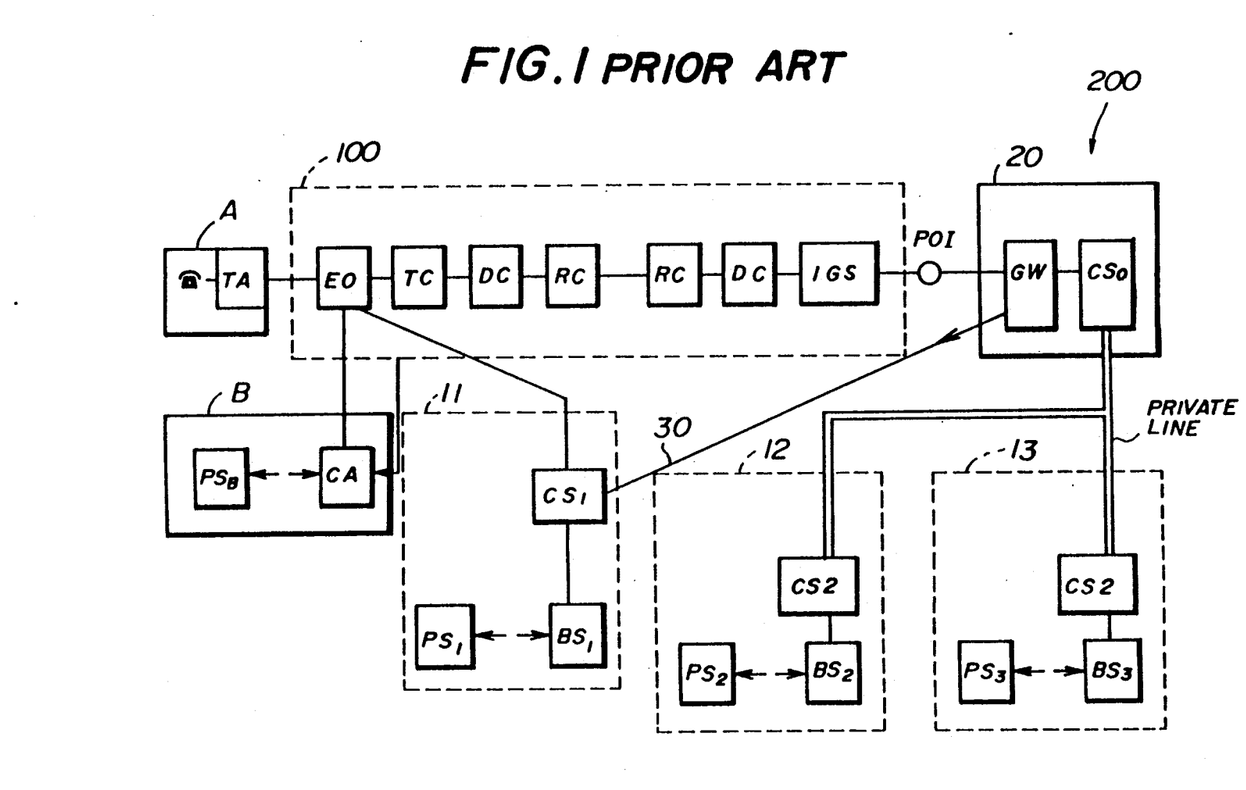
FIG. 1 is a system block diagram generally showing an example of a conventional portable telephone system.

FIG. 1 generally shows an example of a conventional portable telephone system. In FIG. 1, a telephone network 100 is connected to a portable telephone network 200 at a connection point POI via a communication center 20. The telephone network 100 is a public network. When making a call from a telephone set A which is connected to a terminal station EO of the telephone network 100 to a portable station PS of the portable telephone network 200, the calling telephone set A dials a personal identification number (hereinafter simply referred to as PID number) of the portable station, following number of the communication center 20. The call from the calling telephone set A is transmitted from the end terminal EO via a communication line which includes a toll center TC, a district center DC, a regional center RC, an interconnecting gateway switch IGS and the like, and first reaches the communication center 20 of the portable telephone network 200 via the connection point POI. Then, the communication center 20 searches the position of the portable station PS which is called. If the portable station PS is located within a service area 12 or 13 of the portable telephone network 200, the communication center 20 transfers the call from the telephone set A to a portable station $PS_2$ within the service area 12 or, to a portable station $PS_3$ within the service area 13, via a private line, so as to enable a communication by forming a talking line between the calling telephone set A and the portable station $PS_2$ or $PS_3$.

However, when the calling telephone set A which is connected to the terminal station EO of the telephone network 100 makes a call to the portable station PS, the portable station PS may not be located within the service area 12 or 13 of the portable telephone network 200. For example, the called portable station PS may be a portable station $PS_B$ which is connected by radio to a parent station CA of a telephone set B which is independently registered and connected to the terminal station EO of the telephone network 100. On the other hand, the called portable station PS may be a portable station $PS_1$ which is connected by radio to a radio base station BS, where this radio base station BS is controlled by a switching control part $CS_1$ which is connected to the telephone network 100 and is provided in a specific area 11, for example. The switching control part $CS_1$ within the specific area 11 is not connected to the communication center 20 via a private line for economical reasons.

In such cases where the portable station $PS_B$ or $PS_1$ is called, the call is transferred again from the connection point POI to the portable station $PS_B$ of the telephone set B or to the portable station $PS_1$ within the specific area 11 via the communication line of the telephone network 100, and the call is made via the talking line between the telephone set A and the portable station $PS_B$ or $PS_1$. For this reason, the communication line of the telephone network 100 is used twice, that is, once for the going path and once for the returning path, and there is a problem in that the cost of use of the communication line becomes high.

SUMMARY OF THE INVENTION

Accordingly, it is a general object of the present invention to provide a novel and useful portable telephone system in which the problem described above is eliminated.

Another and more specific object of the present invention is to provide a portable telephone system comprising a first telephone network including a terminal station, a first telephone set connected to the first telephone network via the terminal station, a second telephone network including a communication center which is connected to the first telephone network at a connection point, and at least one second telephone set registered in the communication center and connected to the first telephone network via the terminal station, where the second telephone set is a portable telephone set made up of a base station part and a portable station, the communication center includes first means for sending a line hold signal to the first telephone set via the first telephone network when a call to the portable station of the second telephone set is received via the first telephone network, and second means for sending control information to the base station part of the second telephone set, the control information includes a notification that a call is made to the portable station of the second telephone set from the first telephone set and a telephone number of the first telephone set, and the base station part of the second telephone set includes third means for dialing the telephone number of the first telephone set in response to the control information received from the communication center, so that a service after the third means dials the telephone number of the first telephone set is made between the first and second telephone sets via the terminal station of the first telephone network. According to the portable telephone system of the present invention, it is possible to minimize the cost of the use of the line within the first telephone network, and the convenience of the portable station (telephone) is improved.

Other objects and further features of the present invention will be apparent from the following detailed description when read in conjunction with the accompanying drawings.

DESCRIPTION OF THE PREFERRED EMBODIMENTS

Figure 2:
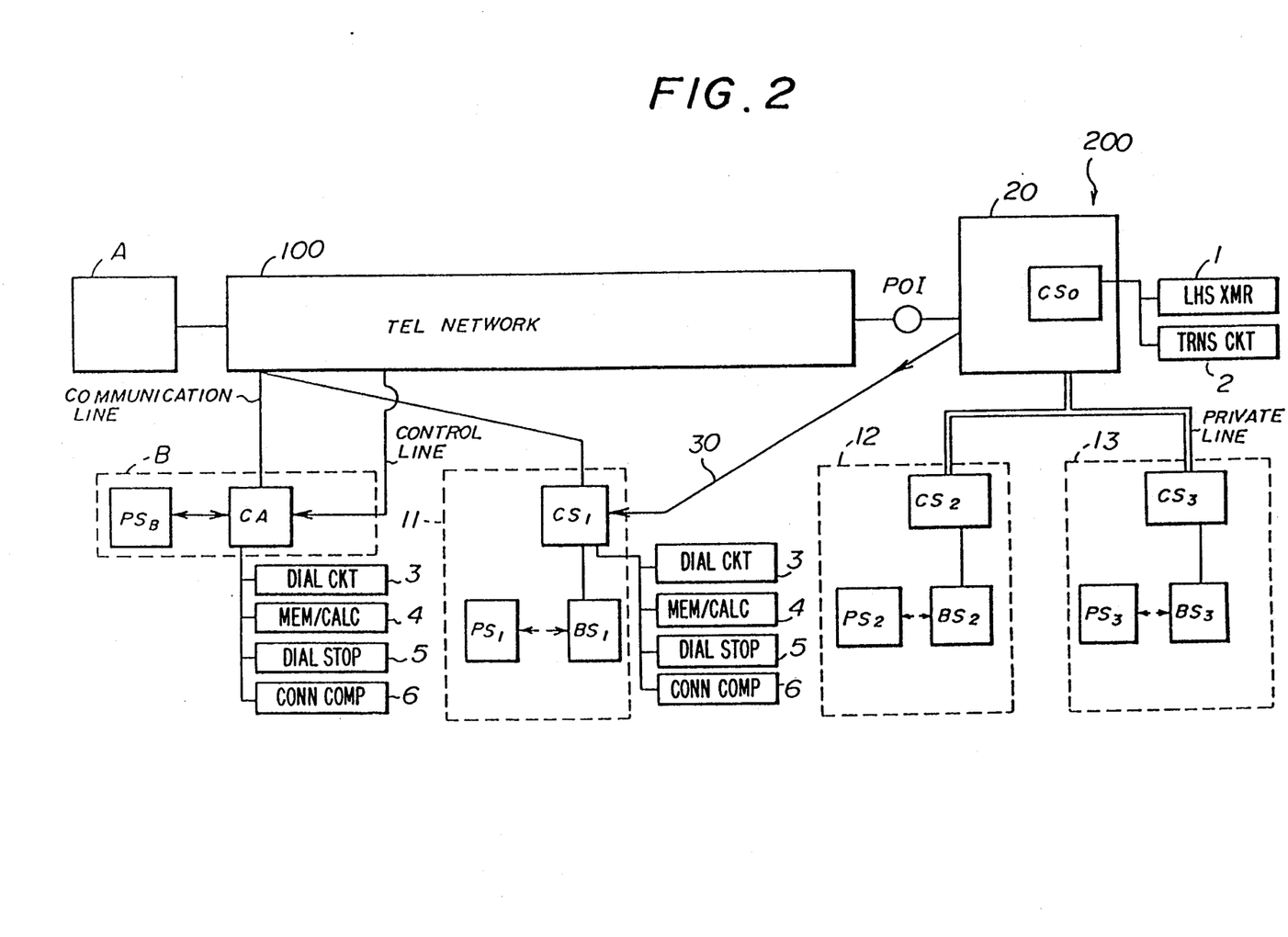
FIG. 2 is a system block diagram for explaining the operating principle of the present invention.

First, a description will be given of the operating principle of the present invention, by referring to FIG. 2. In FIG. 2, those parts which are the same as those corresponding parts in FIG. 1 are designated by the same reference numerals, and a description thereof will be omitted.

In FIG. 2, a transfer circuit ("TRNS CKT") 1 is connected to the switching control part $CS_0$ of the communication center 20 within the portable telephone network 200, and sends a line hold signal to the calling telephone set A of the telephone network 100. A transfer circuit ("TRNS CKT") 2 is connected to the switching control part $CS_0$ of the communication center 20 within the portable telephone network 200, and transfers the call and the telephone number of the calling telephone set A to the parent station CA of the telephone set B of the telephone network 100 via an appropriate communication line of the telephone network 100 or, to the switching control part $CS_1$ which is connected to the telephone network 100 and is provided within a specific area 11 other than the service areas 12 and 13 via a leased line 30, if the parent station CA or the switching control part $CS_1$ is called, for example. In addition, a dialing circuit ("DIAL CKT") 3 is connected to the parent station CA of the telephone set B or to the switching control part $CS_1$ within the specific area 11, and dials the calling telephone set A in response to the call and the telephone number received by the portable station $PS_B$ or $PS_1$.

In the above described case, the portable station $PS_B$ or $PS_1$ which is notified of the call and the telephone number of the calling telephone set A directly dials the calling telephone set A. Hence, the service between the calling telephone set A and the portable station $PS_B$ or $PS_1$ is thereafter made directly via the communication line of the telephone network 100, and not via the communication center 20. As a result, the cost of the use of the communication line is kept down to a minimum because the communication line of the telephone network 100 is only used once and not twice as in the case of the prior art.

Further, in FIG. 2, there optionally may be provided additional elements. The memory and calculator ("MEM/CALC") 4 is connected to the parent station CA of the telephone set B or to the switching control part $CS_1$ within the specific area 11, and stores data for calculating, and calculates the tariff of the call which is made from the portable station $PS_B$ or $PS_1$ to the calling telephone set A. This data stored in the memory 4 can be transmitted to the communication center 20. The dialing stop control circuit ("DIAL STOP") 5 is connected to the parent station CA of the telephone set B or to the switching control part $CS_1$ within the specific area 11, and stops dialing the calling telephone set A if the calling telephone set A does not respond to the ringing tone within a predetermined time. In addition, the connection complete control circuit ("CONN COMP") 6 is connected to the parent station CA of the telephone set B or to the switching control part $CS_1$ within the specific area 11, and transmits to the calling telephone set A a connection complete (or successful) signal if the portable station $PS_B$ connects to the parent station CA via radio or the portable station $PS_1$ connects to the radio base station $BS_1$ by radio. The connection complete control circuit 6 transmits to the calling telephone set A a connection incomplete (or unsuccessful) signal if the portable station $PS_B$ cannot connect to the parent station CA via radio or the portable station $PS_1$ cannot connect to the radio base station $BS_1$ by radio.

By the provision of the memory and calculator 4, it becomes possible to perform accounting with respect to the calling telephone set A by transmitting the data used for calculating the tariff to the communication center 20.

Figure 3:
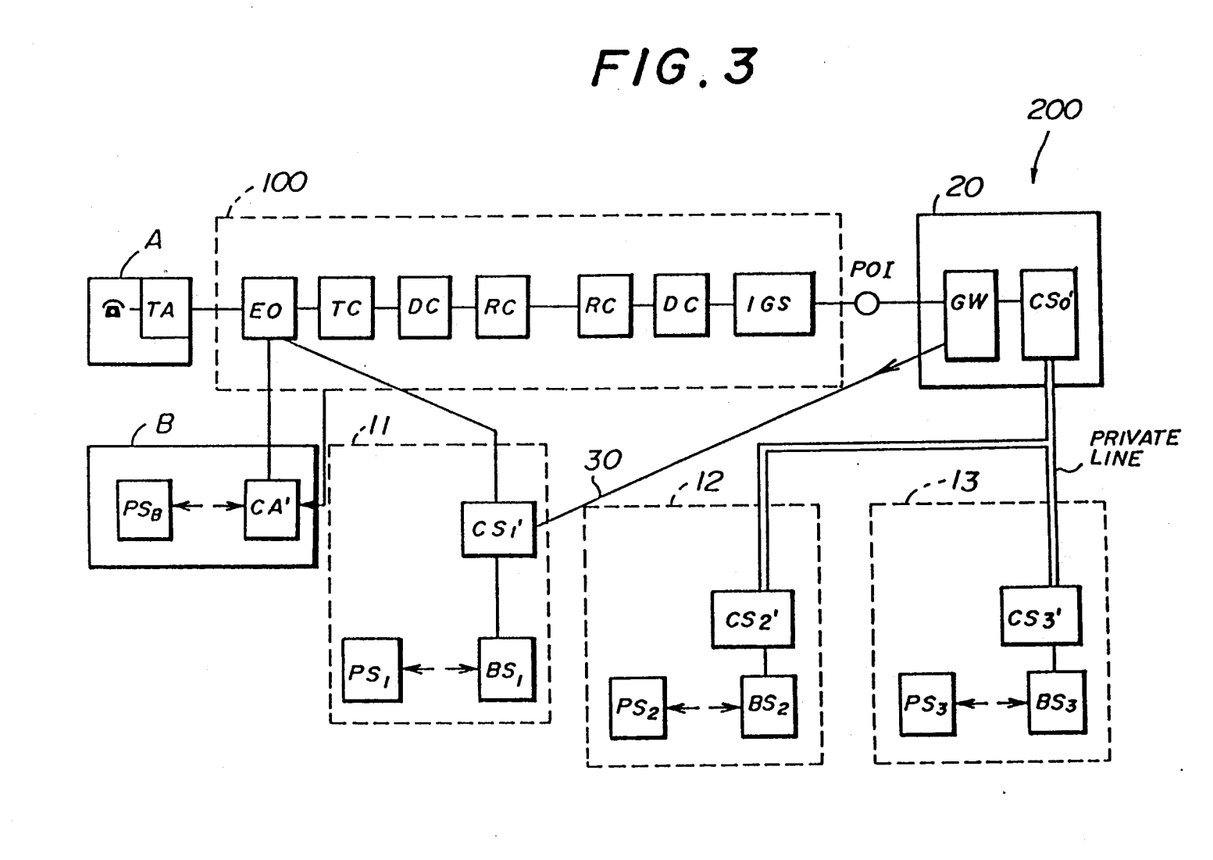
FIG. 3 is a system block diagram generally showing an embodiment of a portable telephone system according to the present invention.

Next, a description will be given of an embodiment of the portable telephone system according to the present invention, by referring to FIG. 3. In FIG. 3, those parts which are the same as those corresponding parts in FIG. 2 are designated by the same reference numerals, and a description thereof will be omitted.

In FIG. 3, the line hold signal transmitter 1 and the transfer circuit 2 (as shown in FIG. 2) are included within the switching control part $CS_0'$ and within each of the parent station CA' and the switching control parts $CS_1'$, $CS_2'$ and $CS_3'$, there is provided the respectively corresponding group of elements comprising a dial circuit 3, a memory and calculator 4, a dialing stop control circuit 5 and a connection complete control circuit 6 (as likewise shown in FIG. 2). When making a call from the telephone set A of the telephone system 100 to the portable station $PS_1$ within the service area 11, or the portable station $PS_2$ within the service area 12, the PID number of the corresponding portable station $PS_1$, or $PS_2$, is dialed subsequently to the number of the communication center 20. In this case, the call is connected to the communication center 20 of the portable telephone system 200 via the telephone network (public network) 100, and the communication center 20 investigates the location of the portable station $PS_1$, or $PS_2$. If the portable station $PS_1$ is located within the service area 12, or if the portable station $PS_2$ is located within the service area 13, the communication center 20 transfers the call from the calling telephone set A to the portable station $PS_1$, or $PS_2$, via the private line and forms a talking line between the calling telephone set A and the portable station $PS_1$, or $PS_2$.

Figure 4:
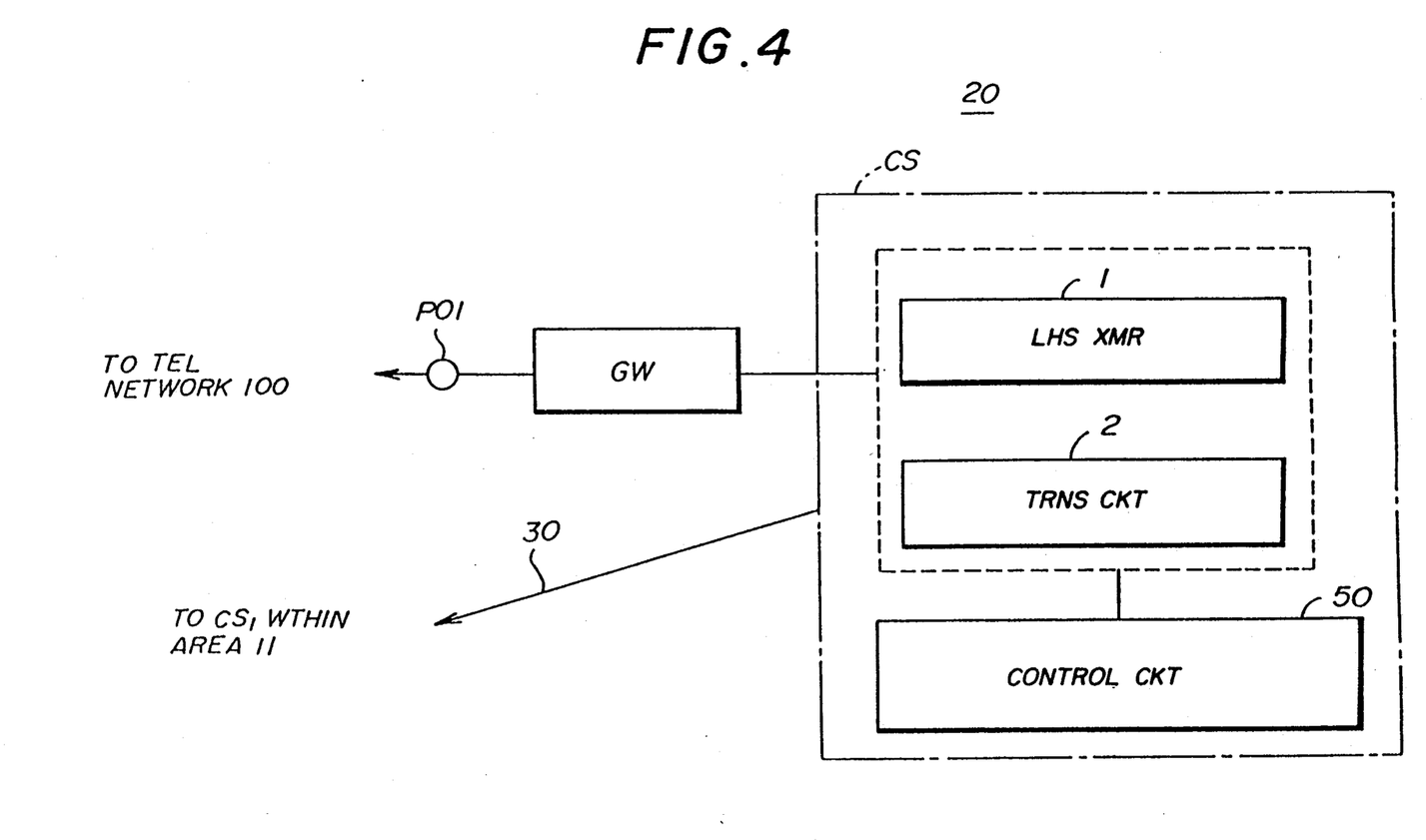
FIG. 4 is a system block diagram showing the construction of a communication center of a portable telephone system.

On the other hand, if the calling telephone set A calls the portable station $PS_B$ which is connected by radio to the parent station CA' of the telephone set B which is registered in the telephone network 100 independently of the telephone set A, the means 1 sends a line hold signal from the communication center 20 with respect to the calling telephone set A. After the telephone set A sends its telephone number to the communication center 20, the telephone set A hooks ON. Next, the means 2 sends from the communication center 20 a notification that a call is made from the calling telephone set A to the portable station $PS_B$ and sends the telephone number of the calling telephone set A to the parent station CA' of the telephone set B via the telephone network 100. In this embodiment and as before-noted, the means 1 and 2 are provided within the switching control part $CS_0'$ of the communication center 20 as shown in FIG. 4. In response to this notification and the telephone number, the dialing circuit 3 directly dials and calls the calling telephone set A from the parent station CA' of the telephone set B via the telephone network 100. As a result, a talking line is formed between the telephone sets B and A and service is provided via this talking line.

In FIG. 4, the communication center 20 includes the switching control part $CS_0$ and a gateway GW. In addition, a control part 50 of the switching control part $CS_0'$ controls the general operation of the switching control part $CS_0'$, including control of the means 1 and 2. The control part 50 also manages all telephone sets within the portable telephone system 200, and manages accounting of services provided with respect to each telephone set which is within the telephone network 100 and which is registered in the switching control part $CS_0'$.

After the service ends, the memory and calculator 4 assembles the accounting data and sends this accounting data to the communication center 20. In response to this accounting data, the communication center 20 performs call accounting with respect to the calling telephone set A, and which is registered in the communication center 20 in advance. In addition, at the called telephone set B, the means 5 connected to the parent station $CA'$ in FIG. 3 stops the dialing to the calling telephone set A if the telephone set A does not respond to the ringing tone within a predetermined time. Furthermore, the means 6 connected to the parent station $CA'$ of the called telephone set B transmits a connection complete signal to the calling telephone set A if the portable station $PS_B$ is connected by radio to the parent station $CA'$ and transmits a connection incomplete signal to the calling telephone set A if the portable station $PS_B$ cannot be connected by radio to the parent station $CA'$. In this case, the means 3, 4, 5 and 6 are provided within the parent station $CA'$ of the telephone set B, as before-noted and as shown in further detail in FIG. 5.

Figure 5:
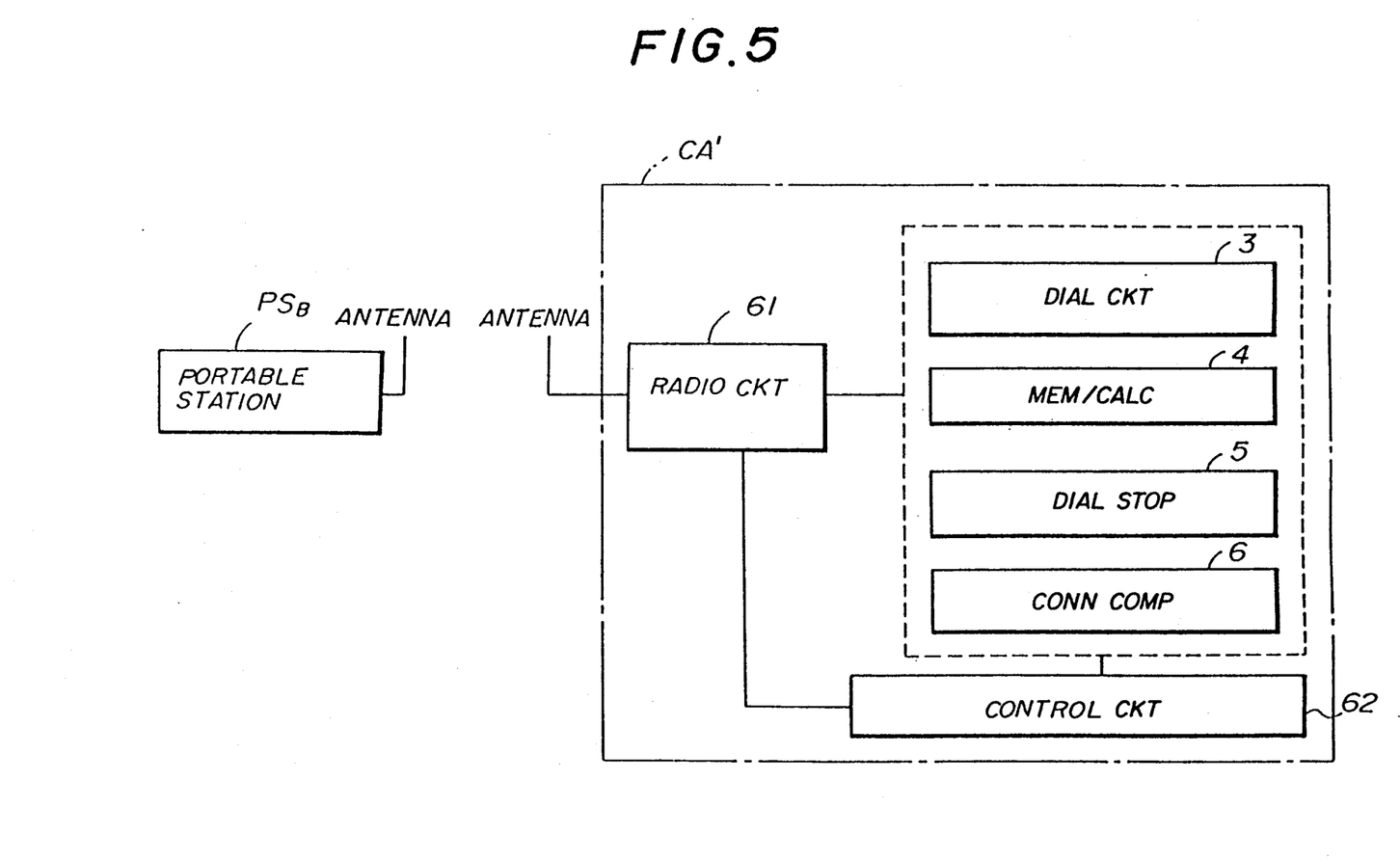
FIG. 5 is a system block diagram showing the construction of a telephone set B which receives a call which originates from a calling telephone set A and is transferred via the communication center.

In FIG. 5, the parent station $CA'$ includes a radio circuit ("RADIO CKT") 61 and control circuit ("CONTROL CKT") 62 for controlling the general operation of the parent station $CA'$, including control of the dialing circuit 3, the memory and calculator 4, the dialing stop control circuit 5 and the connection complete control circuit 6 and the radio circuit 61. The radio circuit 61 connects the parent station $CA'$ and the portable station $PS_B$ via antennas.

The calling telephone set A of the telephone network 100 may call a portable station $PS_1$ which is located within the specific area 11 which is other than the service areas 12 and 13 and is not connected to the portable telephone system 200 for economical reasons. The portable station $PS_1$ is connected by radio to the switching control part $CS_1'$ which is connected to the telephone system 100. In this case, the operation is carried out similarly as in the case where the telephone set B is called. In other words, the line hold signal transmitter 1 sends the line hold signal from the communication center 20 to the calling telephone set A, and the calling telephone set A hooks ON after sending its telephone number to the communication center 20. Then, the transfer circuit 2 sends a notification indicating that a call is made from the calling telephone set A to the portable station $PS_1$ via the base station $BS_1$ and sends the telephone number of the telephone set A to the switching control part $CS_1'$ within the specific area 11 from the communication center 20. The notification and the telephone number of the telephone set A is transmitted from the communication center 20 to the switching control part $CS_1'$ via the leased line 30. Alternatively, the notification and the telephone number of the telephone set A may be transmitted from the communication center 20 to the switching control part $CS_1'$ via the telephone system 100. The dialing circuit 3 directly calls the calling telephone set A from the switching control part $CS_1'$ via the telephone network 100 in response to the notification and the telephone number of the calling telephone set A. Hence, a talking line is formed between the portable station $PS_1$ and the calling telephone set A, and a service is provided via this talking line. After the service ends, the means 4 calculates the accounting data, and this accounting data is sent from the switching control part $CS_1'$ to the communication center 20 via the leased line 30 (FIG. 3).

The communication center 20 receives the accounting data from the switching control part $CS_1'$ and performs call accounting with respect to the calling telephone set A, which is registered in advance in the communication center 20. At the specific area 11, the dialing stop control circuit 5 connected to the switching control part $CS_1'$ stops the dialing to the calling telephone set A if the telephone set A does not respond to the ringing tone from the portable station $PS_1$ within a predetermined time. In addition, the connection complete control circuit 6 connected to the switching control part $CS_1'$ transmits a connection complete signal to the calling telephone set A if the portable station $PS_1$ is connected by radio to the base radio station $BS_1$ and transmits a connection incomplete signal to the calling telephone set A if the portable station $PS_1$ cannot be connected by radio to the radio base station $BS_1$. In this case, the dialing circuit 3, the memory and calculator 4, the dialing stop control circuit 5 and the connection complete control circuit 6 are provided within the switching control part $CS_1'$, similarly as in the case shown in FIG. 5.

In this embodiment, it is not essential that the switching control part $CS_1'$ within the specific area 11 be connected to the communication center 20 via the leased line 30. The necessary control information may be transmitted from the communication center 20 to the switching control part $CS_1'$ via the telephone network 100, as described above.

Furthermore, the number of telephone sets and the number of specific areas provided with respect to the telephone network 100 are not limited to those of this embodiment. Similarly, the number of service areas connected to the communication center 20 via the private line is not limited to that of this embodiment.

In FIG. 3, the portable telephone system 200 and the service areas 12 and 13 may be located within a first branch office of a company, for example. The service areas 12 and 13 may be located within the same office building. On the other hand, the telephone set B may be located within second branch office of the company. The specific area 11 may be located within the second branch office or within the first branch office. In the latter case, for example, the specific area 11 may be located within a building different from the building in which the service areas 12 and 13 are located.

Figure 6:
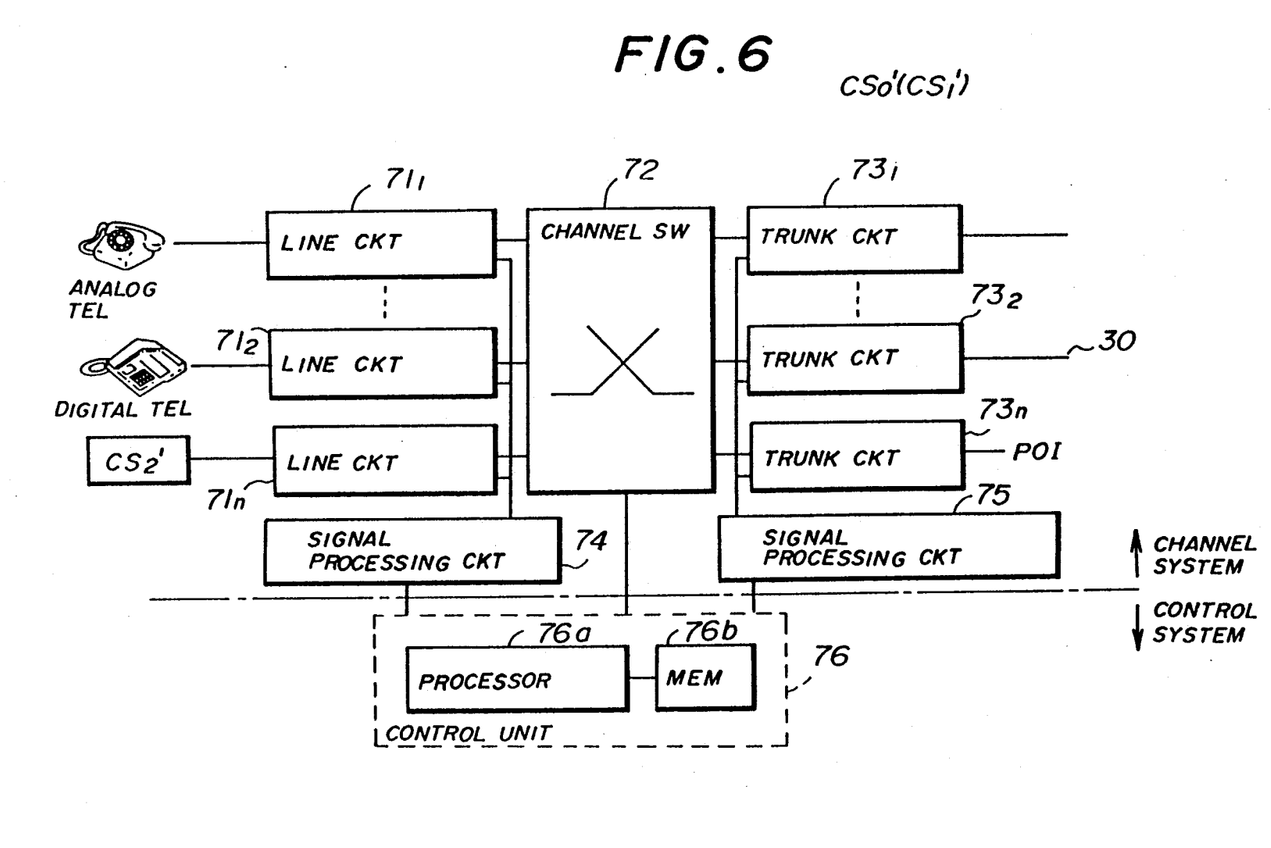
FIG. 6 is a system block diagram showing an embodiment of a switching control part shown in FIG. 3.

FIG. 6 shows an embodiment of the switching control part $CS_0'$ of the communication center 20. The switching control part $CS_0'$ has a construction which is basically the same as that of a digital private branch exchange (PBX). The switching control part $CS_0'$ includes line circuits $71_1$ through $71_n$, a channel switch ("CHANNEL SW") 72, trunk circuits ("TRUNK CKT") $73_1$ through $73_n$, signal processing circuit (SIGNAL PROCESSING CKT) 74 an 75, and a control unit 76 which are connected as shown. The control unit 76 includes a processor 76a and a memory ("MEM") 76b.

The line circuits $71_1$ through $71_n$ function as interface circuits for connecting communication terminals such as a telephone set to a channel. In addition to communication information such as speech, signals for controlling the communication, such as the telephone number of a destination, pass through the line circuits $71_1$ through $71_n$. For example, the line circuit $71_1$ is connected to an analog telephone set, the line circuit $71_2$ is connected to a digital telephone set, and the line circuit $71_n$ is connected to the switching control part $CS_2$.

The trunk circuits $73_1$ through $73_n$ function as interface circuits for connecting to telephone networks (public networks) and the like. For example, the trunk circuit $73_1$ is connected to an office line, the trunk circuit $73_2$ is connected to the leased line 30, and the trunk circuit $73_n$ is connected to the connection point POI.

The channel switch 72 switches the communication information to an arbitrary destination. The destination may be an extension, an office line or the like.

The signals for controlling the communication, such as the telephone number, are transmitted and received via the line circuits $71_1$ through $71_n$ and the trunk circuits $73_1$ through $73_n$. The signal processing circuits 74 and 75 function as interfaces for connecting the channel system to the control system.

The control unit 76 receives from the signal processing circuits 74 and 75 the signals which are required to make the communication, and carries out a general control of the switching control part $CS_0'$. The control unit 76 drives the channels by opening and closing the channels, and delivers call signals and the like to the terminals via the signal processing circuits 74 and 75. In addition, the processor 76a of the control unit 76 carries out the functions of the line hold signal transmitter 1, the transfer circuit 2 and the control circuit 50 shown in FIG. 4. The telephone sets (or telephone numbers) which are registered in advance in the switching control part $CS_0'$ are stored in the memory 76b of the control unit 76. Hence, the control unit 76 has, in addition to the functions used in the digital PBX, a function of storing the position registration information of each portable station and a function of calling each portable station via a corresponding switching control part (base station) based on the position registration information.

The construction of the switching control part $CS_1'$ (and the switching control part $CS_2'$) is basically the same as that of the switching control part $CS_0'$ shown in FIG. 6. However, in the case of the switching control part $CS_1'$, the line circuit $71_n$ is connected to the radio base station $BS_1$ rather than to a switching control part.

Figure 7:
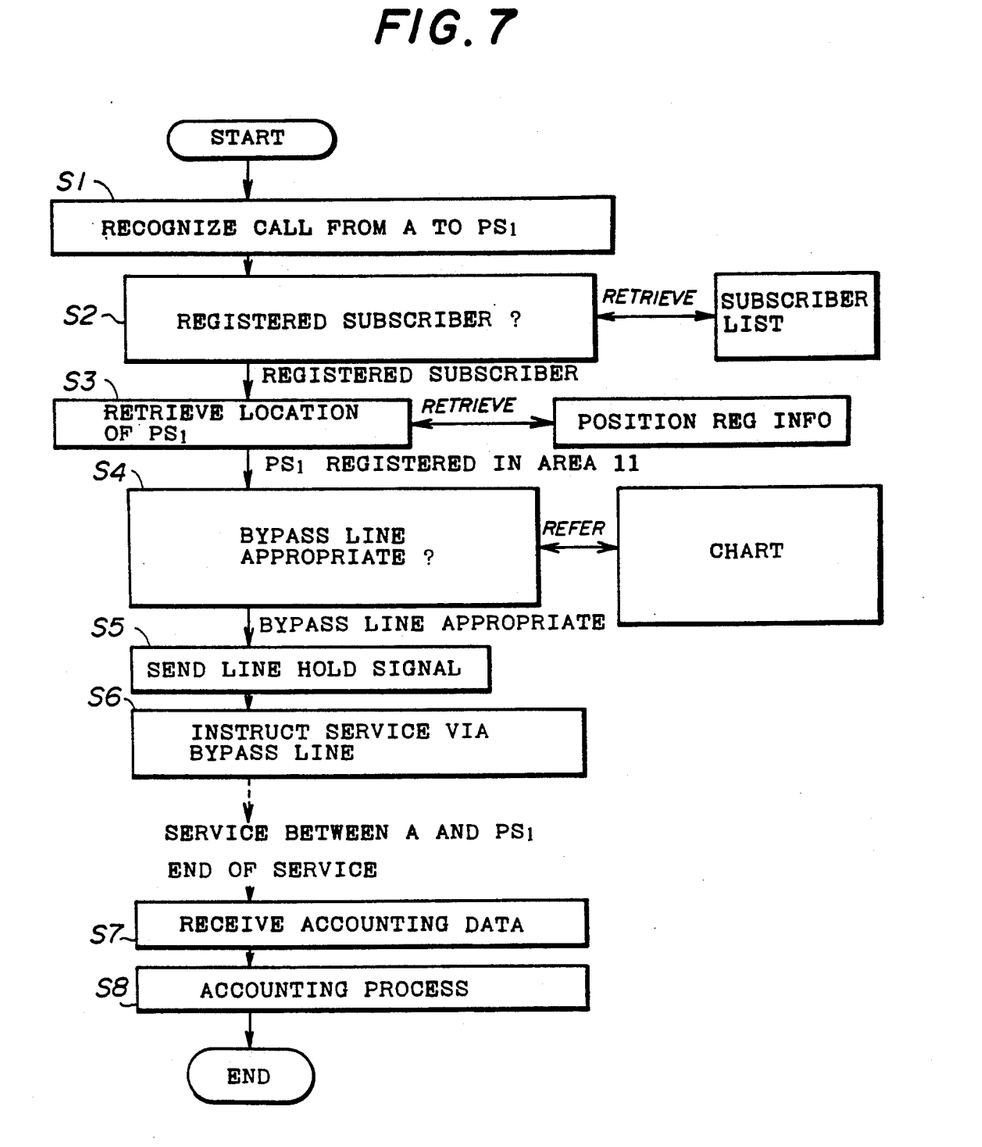
FIG. 7 is a flow chart for explaining the operation of the switching control part of a communication center.

Next, a more detailed description will be given of the operation of the switching control part $CS_0'$ shown in FIG. 6 when the calling telephone set A calls the portable station $PS_1$. FIG. 7 shows the operation of the processor 76a of the control unit 76 for this case.

In FIG. 7, a step S1 recognizes a call to the portable station $PS_1$ from the calling telephone set A. A step S2 refers to a list of subscribers stored in the memory 76b so as to decide whether or not the telephone set A is registered in the portable telephone system 200 and is authorized to receive the service. The reference to the list of subscribers can be made based on the telephone number of the telephone set A which is received from the telephone set A. If the telephone set A is registered in the list of subscribers, a step S3 retrieves the location of the portable station $PS_1$ from the position registration information which is related to the registered portable stations and is stored in the memory 76b.

Then, a step S4 decides whether or not the service should be provided using a bypass line by referring to a chart which is stored in the memory 76b. This chart indicates at least the positional relationships of the portable stations and the telephone set A. In this case, since it becomes known from the step S3 that the called portable station $PS_1$ is located within the specific area 11, the step S4 can determine from the chart whether or not the use of the bypass line is the most economical route.

If the step S4 determines that the bypass line should be used for the service, a step S5 sends a line hold signal to the telephone set A so as to instruct the telephone set A to hold the line. This step S5 corresponds to the function of the line hold signal transmitter 1 shown in FIG. 4. A step S6 instructs the switching control part $CS_1$ to provide the service via the bypass line when the portable station $PS_1$ is called from the telephone set A. This step S6 corresponds to the function of the transfer circuit 2 shown in FIG. 4. Thereafter, the service between the telephone set A and the portable station $PS_1$ is provided via the switching control part $CS_1'$, and the process advances to a step S7 when the service ends.

The step S7 receives the accounting data from the switching control part $CS_1'$. A step S8 carries out an accounting process based on the received accounting data, so as to charge the tariff of the service (call) to a subscriber account of the telephone set A, and the process ends.

Figure 8:
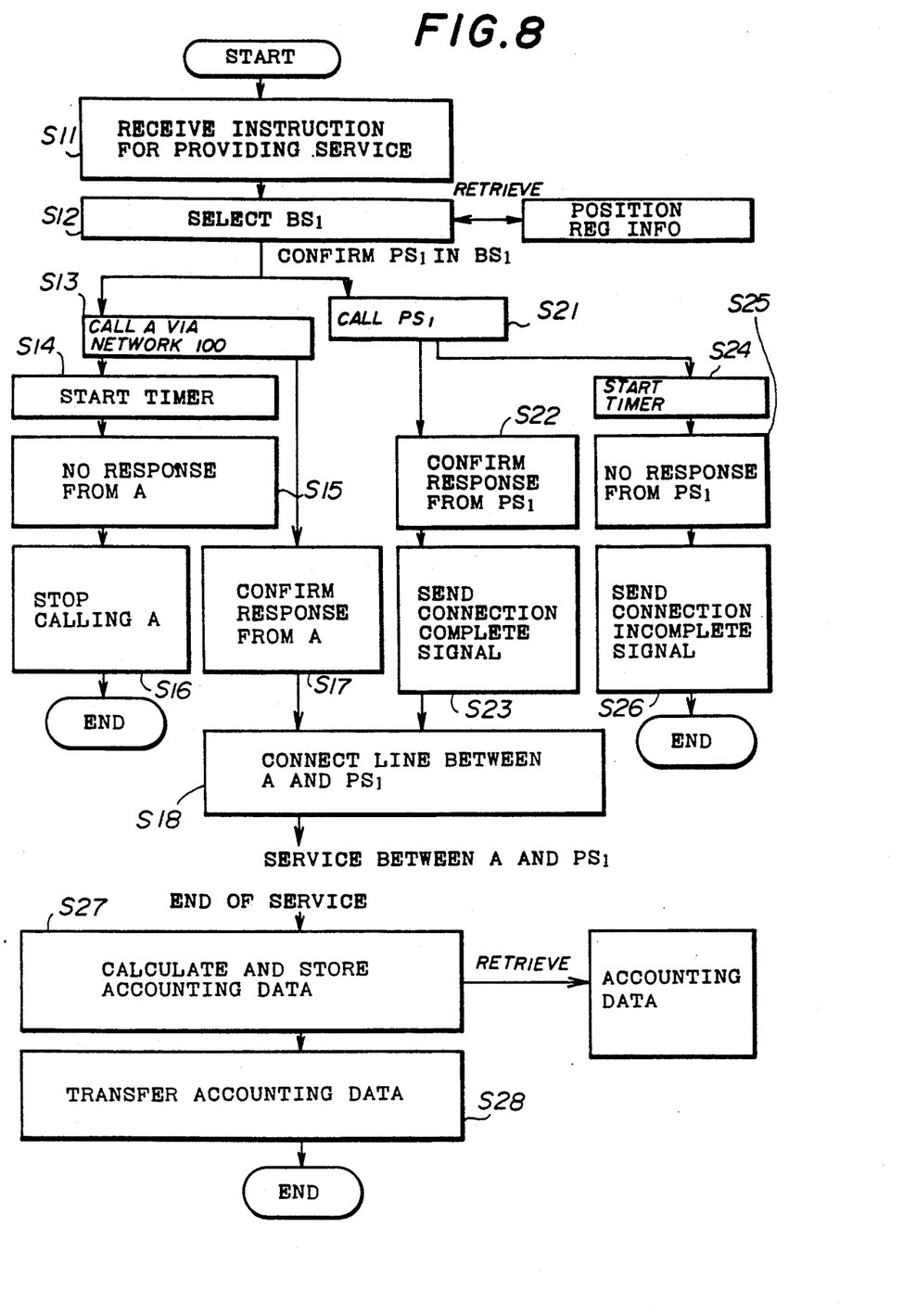
FIG. 8 is a flow chart for explaining the operation of the switching control part within a specific area.

Next, a more detailed description will be given of the operation of the switching control part $CS_1'$ shown in FIG. 6 when the calling telephone set A calls the portable station $PS_1$. FIG. 8 shows the operation of the processor 76a of the control unit 76 for this case.

In FIG. 8, a step S11 receives the call to the portable station $PS_1$ from the calling telephone set A via the switching control part $CS_0'$ and is instructed by the switching control part $CS_0'$ to provide the service via the bypass line (step S6 shown in FIG. 7). A step S12 selects the radio base station $BS_1$ in which the portable station $PS_1$ is registered, by referring to the position registration information which is related to the registered portable stations and is stored in the memory 76b. If the portable station $PS_1$ is registered in the radio base station $BS_1$, a step S13 calls the telephone set A via the telephone network 100 on one hand and, on the other hand, a step S21 simultaneously calls the portable station $PS_1$. The step S13 corresponds to the function of the dialing circuit 3.

After the step S13, a step S14 starts a first timer. If no response is received from the telephone set A within a predetermined time in a step S15, a step S16 stops the calling of the telephone set A and the process ends. On the other hand, if the telephone set A responds within the predetermined time in a step S17, a step S18 connects the telephone set A and the portable station $PS_1$ via the telephone network 100. Hence, the steps S14 through S17 correspond to the function of the dialing stop control circuit 5.

On the other hand, when the step S21 calls the portable station $PS_1$, steps S22 and S24 are carried out simultaneously. The step S24 starts a second timer and, if no response is received from the portable station $PS_1$ within a predetermined time in a step S25, a step S26 sends a connection incomplete signal to the telephone set A and the process ends. But if the portable station $PS_1$ responds within the predetermined time in a step S22, a step S23 sends a connection complete signal to the telephone set A and the step S18 connects the telephone set A and the portable station $PS_1$ via the telephone network 100. Thus, the steps S22 through S26 correspond to the step S6.

The service is provided between the telephone set A and the portable station $PS_1$ after the two are connected via the telephone network 100. When the service ends, a step S27 calculates the accounting data for the use of the telephone network 100 and stores the accounting data in the memory 76b. This step S27 corresponds to the function of the memory and calculator 4. A step S28 transfers the accounting data retrieved from the memory 76b to the switching control part $CS_0'$ together with the telephone number of the telephone set A, and the process ends. As described above, the accounting data and the telephone number may be transferred to the switching control part $CS_0'$ via the leased line 30 or via the telephone network 100.

Next, a description will be given of the construction of the calling telephone set A and the construction of a telephone adapter in particular, by referring to FIG. 9.

Figure 9:
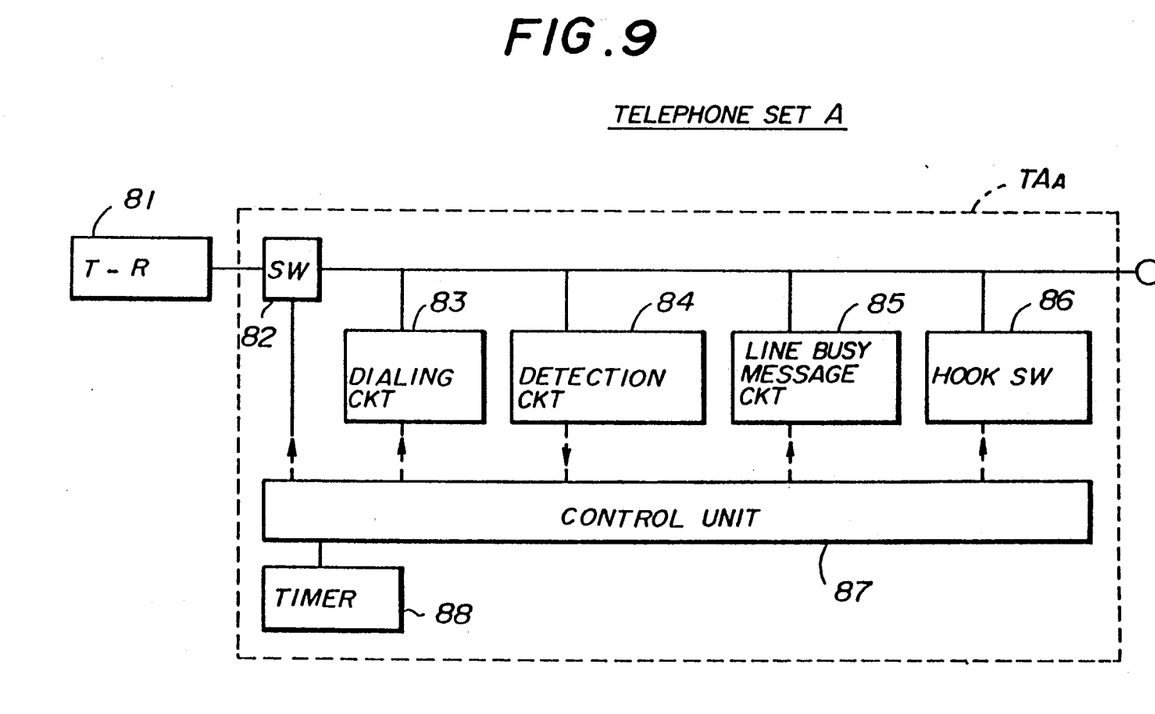
FIG. 9 is a system block diagram showing an embodiment of a telephone adapter of the telephone set A.

In FIG. 9, the telephone set A includes a transmitter-receiver 81 and a telephone adapter $TA_A$. The telephone adapter $TA_A$ includes a switch 82, a dialing circuit 83, a line hold signal detection circuit 84, a line busy message circuit 85, a hook switch 86, a control unit 87 and a timer 88 which are connected as shown. The control unit 87 includes a central processing unit (CPU) and a memory. The control unit 87 controls the general operation of the telephone adapter $TA_A$, as will be described later in conjunction with FIG. 10.

The switch 82 selectively connects the transmitter-receiver 81 and the telephone adapter $TA_A$ under the control of the control unit 87. The dialing circuit 83 is used when dialing a telephone number. The line hold signal detection circuit 84 detects the line hold signal and outputs a detection signal to the control unit 87. The line busy message circuit 85 is used when outputting a line busy message. The hook switch 86 is turned ON/OFF by the control unit 87. The timer 88 times various times required by the control unit 87.

Figure 10:
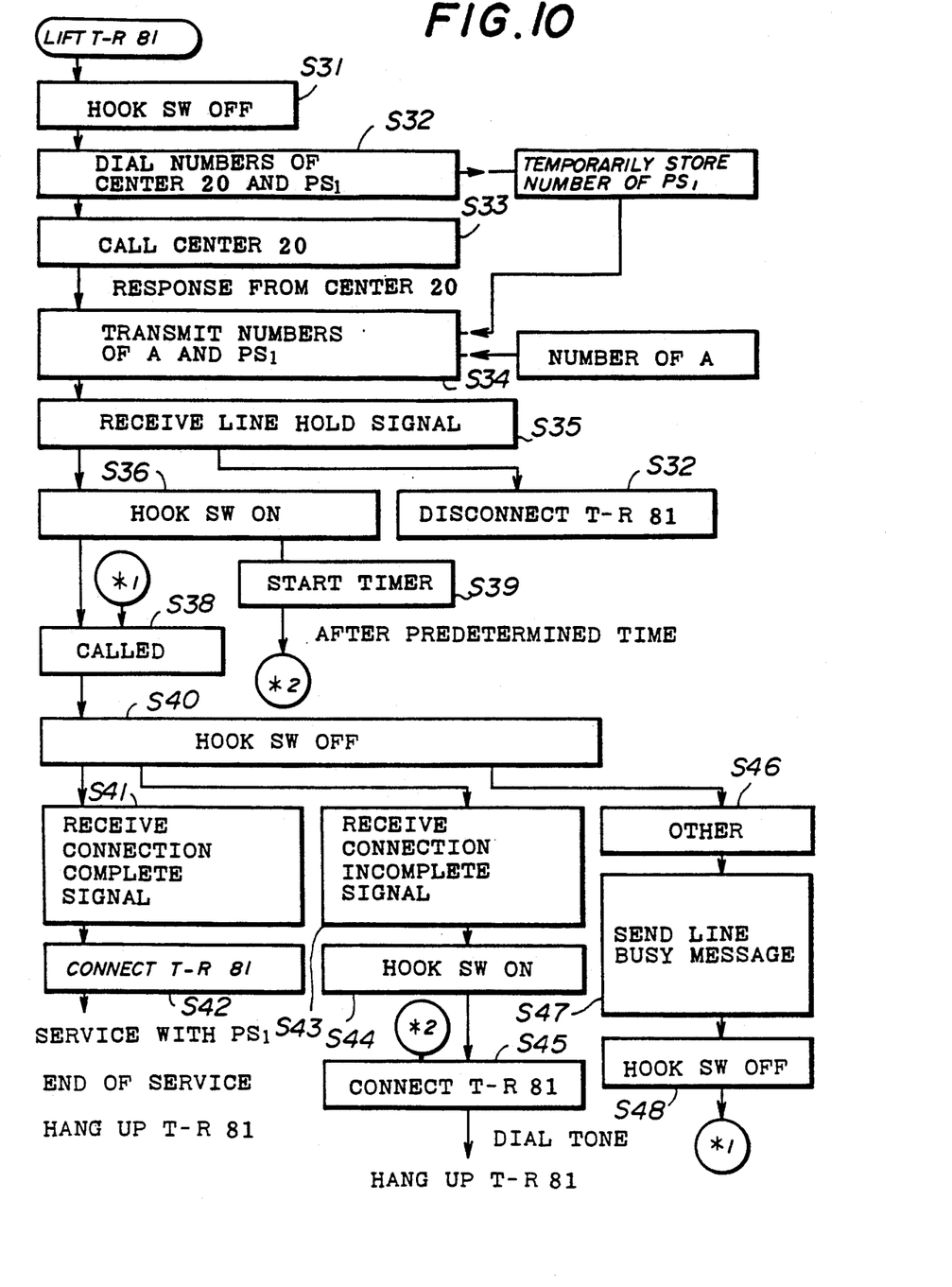
FIG. 10 is a flow chart for explaining the operation of the telephone set A.

FIG. 10 shows the operation of the control unit 87 for the case where the calling telephone set A calls the portable station $PS_1$. The process shown in FIG. 10 starts when the transmitter-receiver (handset) 81 of the telephone set A is unhooked.

In FIG. 10, a step S31 turns the hook switch 86 OFF, and a step S32 dials the number of the communication center 20 and the number of the portable station $PS_1$ via the dialing circuit 83. The number of the portable station $PS_1$ is temporarily stored in the memory of the control unit 87. Then, a step S33 calls the number of the communication center 20, and a step S34 transmits the number of the telephone set A and the number of the portable station $PS_1$ when the communication center 20 responds to the call. The number of the portable station $PS_1$ stored in the step S32 is retrieved from the memory of the control unit 87, and the number of the telephone set A is retrieved from a part of this memory where the number of the telephone set A is registered in advance.

A step S35 receives the line hold signal from the switching control part $CS_0$ (step S5 shown in FIG. 7) and the line hold signal is detected by the line hold signal detection circuit 84. A step S36 turns the hook switch 86 ON in response to the detection signal from the line hold signal detection circuit 84, and at the same time, a step S37 disconnects the transmitter-receiver 81 from the telephone adapter $TA_A$ by controlling the switch 82. A step S38 receives a call, and a step S39 simultaneously starts a timer to time a predetermined time. The process advances to a step S45 which will be described later after the predetermined time, as timed by the step S39, elapses.

After the step S38 receives the call, a step S40 turns the hook switch 86 OFF, and steps S41, S43 and S46 are carried out in parallel. The step S41 receives the connection complete signal from the switching control part $CS_1'$ (step S23 shown in FIG. 8), and a step S42 connects the transmitter-receiver 81 to the telephone adapter $TA_A$ by controlling the switch 82. After the step S42, the service between the telephone set A and the portable station $PS_1$ is enabled, and the transmitter-receiver 81 is hooked after the service ends.

On the other hand, the step S43 receives the connection incomplete signal from the switching control part $CS_1'$ (step S26 shown in FIG. 8), and a step S44 turns the hook switch 86 ON. Then, the step S45 connects the transmitter-receiver 81 to the telephone adapter $TA_A$ by controlling the switch 82. The transmitter-receiver 81 is hooked in this case because the dial tone is heard by the operator of the telephone set A and it is indicated that the line connection has failed.

The step S46 receives a signal, other than the connection complete signal and the connection incomplete signal, from the switching control part $CS_1'$ if any. A step S47 transmits a line busy message from the line busy message circuit 85, and a step S48 turns the hook switch 86 OFF. The line busy message signals the operator of the telephone set A that the line is busy. The process advances to the step S38 after the step S48, and the step S38 receives a call.

Of course, the telephone adapter $TA_A$ shown in FIG. 9 and the circuits 84 and 85 in particular may also be provided in the parent station CA of the telephone set B or, in the portable telephone set in any of the areas 11, 12 and 13.

If the calling telephone set A calls the portable station $PS_B$ of the telephone set B, an operation similar to that shown in FIG. 10 is carried out by providing the functions of the switching control part $CS_1'$ described with reference to FIG. 8 within the parent station CA' of the telephone set B.

Figure 11:
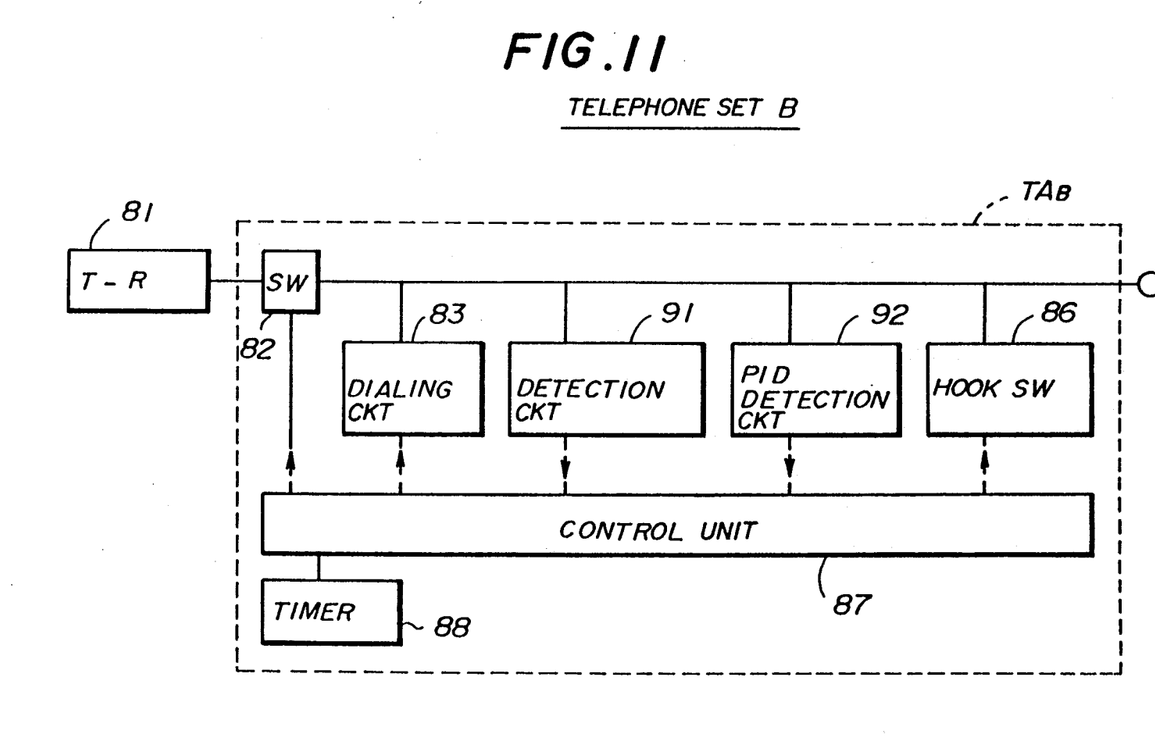
FIG. 11 is a system block diagram showing an embodiment of a telephone adapter of the telephone set B.

Next, a description will be given of the construction of the called telephone set B and the construction of a telephone adapter in particular, by referring to FIG. 11. In FIG. 11, those parts which are the same as those corresponding parts in FIG. 9 are designated by the same reference numerals, and a description thereof will be omitted.

In FIG. 11, the telephone set B includes a transmitter-receiver ("T-R") 81 of the portable station $PS_B$ and a telephone adapter $TA_B$. The telephone adapter $TA_A$ includes a switch 82, a dialing circuit 83, a transfer number detection circuit 91, a PID detection circuit 92, a hook switch 86, a control unit 87 and a timer 88 which are connected as shown. When the calling telephone set A calls the portable station $PS_B$ of the telephone set B, the telephone set B receives from the communication center 20 the notification indicating that the portable station $PS_B$ is being called by the calling telephone set A and the telephone number of the telephone set A. The transfer number detection circuit 91 detects the telephone number of the telephone set A, so that the dialing circuit 83 can dial the telephone number of the telephone set A. The PID detection circuit 92 detects the received PID number and compares it with the PID number of the portable station $PS_B$ so as to determine whether or not the portable station $PS_B$ of the telephone set B is being called.

Further, the present invention is not limited to these embodiments, but various variations and modifications may be made without departing from the scope of the present invention.

What is claimed is:

1. A portable telephone system comprising:

a first telephone network including a terminal station;

a first telephone set connected to the first telephone network via the terminal station;

a second telephone network including a communication center which is connected to the first telephone network at a connection point; and at least one second telephone set registered in the communication center and connected to the first telephone network via the terminal station, said second telephone set being a portable telephone set comprising a base station part and a portable station;

said communication center comprising first means for sending a line hold signal to the first telephone set via the first telephone network when a call to the portable station of the second telephone set is received via the first telephone network, and second means for sending control information to the base station part of the second telephone set, said control information including a notification that a call is being placed to the portable station of the second telephone set by the first telephone set and a telephone number of the first telephone set, said base station part of the second telephone set comprising third means for dialing the telephone number of the first telephone set in response to the control information received from the communication center, so that a service connection, after the third means dials the telephone number of the first telephone set, is made between the first and second telephone sets via the terminal station of the first telephone network.

2. The portable telephone system as claimed in claim 1, wherein said second means of the communication center sends the control information to the base station part of the second telephone set via the first telephone network.

3. The portable telephone system as claimed in claim 1, wherein said second means of the communication center sends the control information to the base station part of the second telephone set via a line which is independent of the first telephone network.

4. The portable telephone system as claimed in claim 1, which further comprises at least one third telephone set connected to the communication center via a private line, each said third telephone set being a portable telephone set and comprising a base station part and a portable station which is registered in the communication center.

5. The portable telephone system as claimed in claim 1, wherein said base station part of the second telephone set further comprises means for calculating and storing accounting data related to the service between the portable station of the second telephone set and the first telephone set and for sending the accounting data to the communication center.

6. The portable telephone system as claimed in claim 1, wherein said base station part of the second telephone set further comprises means for stopping said third means from dialing the telephone number of the first telephone set if the first telephone set does not respond to the call within a predetermined time.

7. The portable telephone system as claimed in claim 1, wherein said base station part of the second telephone set further comprises means for sending a connection complete signal to the first telephone set if a radio connection is made between the base station part and the portable station of the second telephone set and for sending a connection incomplete signal to the first telephone set if no radio connection is made between the base station part and the portable station of the second telephone set.

8. The portable telephone system as claimed in claim 1, wherein said first telephone set includes a handset, a hook switch, means for automatically turning ON the hook switch in response to the line hold signal, means for disconnecting the handset simultaneously with the turning ON of the hook switch, and means for automatically turning the hook switch OFF in response to a call in a state in which the hook switch is ON and the handset is disconnected.

9. The portable telephone system as claimed in claim 8, wherein said first telephone set further comprises means for sending a line busy message before turning the hook switch ON when no predetermined signal is received in a state where the hook switch is OFF, and for connecting the handset in a state in which the hook switch is OFF if the predetermined signal is received.

10. The portable telephone system as claimed in claim 9, wherein said base station part of the second telephone set further comprises means for sending a connection complete signal to the first telephone set if a radio connection is made between the base station part and the portable station of the second telephone set and for sending a connection incomplete signal to the first telephone set if no radio connection is made between the base station part and the portable station of the second telephone set, said predetermined signal being the connection complete signal.

* * * * *

UNITED STATES PATENT AND TRADEMARK OFFICE
CERTIFICATE OF CORRECTION

PATENT NO. : 5,295,179
DATED : Mar. 15, 1994
INVENTOR(S) : ASAHARA et al.

It is certified that error appears in the above-indentified patent and that said Letters Patent is hereby corrected as shown below:

Col. 3, line 16, change "transfer circuit ("TRNS CKT")" to --line hold signal transmitter ("LHS XMR")--.

Col. 4, line 35, after "the" (first occurrence) insert --corresponding--; and delete "corresponding".

Col. 5, line 37, after "and" insert --a--.

Col. 6, line 67, change "circuit" to --circuits--;
line 68, change "74 an 75" to --74 and 75--.

Signed and Sealed this

Seventeenth Day of October, 1995

Attest:

BRUCE LEHMAN

Attesting Officer

Commissioner of Patents and Trademarks